(No Model.)
J. BONNER.
JEWELRY.
No. 443,425.  Patented Dec. 23, 1890.
Fig. 1.
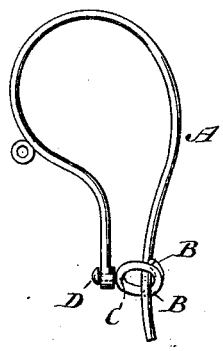
Fig. 2.  Fig. 3.
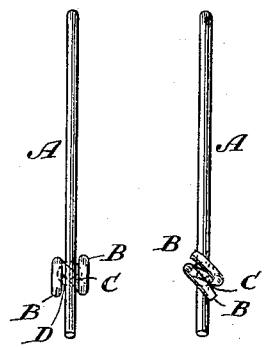
Fig. 4.  Fig. 5.
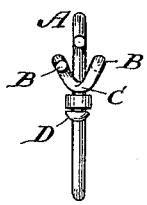 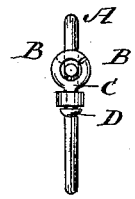
Fig. 6.
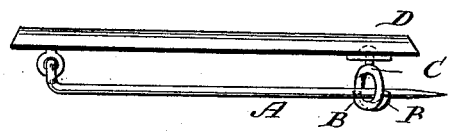
WITNESSES:
Edward Wolff
William Miller
INVENTOR:
Julius Bonner
BY Van Santvoord & Hauff
ATTORNEYS

UNITED STATES PATENT OFFICE.

JULIUS BONNER, OF NEW YORK, N. Y.

JEWELRY.

SPECIFICATION forming part of Letters Patent No. 443,425, dated December 23, 1890.

Application filed July 5, 1890. Serial No. 357,820. (No model.)

*To all whom it may concern:*

Be it known that I, JULIUS BONNER, a citizen of the United States, residing at New York, in the county and State of New York, have invented new and useful Improvements in Catches for Bars for Ear-Rings, Lace-Pins, &c., of which the following is a specification.

This invention relates to a catch for the bars of ear-rings, lace-pins, and other articles; and it consists in the details of construction set forth in the following specification and claims and illustrated in the accompanying drawings, in which—

Figure 1 is a side elevation of the catch in its engaging position. Fig. 2 is a plan view of the catch in its releasing position. Fig. 3 is a plan view of the catch in its engaging position. Fig. 4 is an end view of the catch in its releasing position. Fig. 5 is an end view of the catch in its engaging position. Fig. 6 shows the invention applied to a lace-pin.

In the drawings, the letter A indicates a bar, which is jointed to any desired article—such, for example, as an ear-ring, Fig. 1, a lace-pin, Fig. 6, or other object. The free end of the bar is adapted to be caught or locked by a catch, which is shown as consisting of two hooked branches B B. The branches B B are divergent or placed some distance apart, so that when the catch is in its releasing position, Figs. 2 and 4, the bar A can pass in or out between said branches. The inclined portion or incline C connects the two branches, and D is a swivel-support for the catch.

When the catch is in its releasing position, Figs. 2 and 4, and the bar A is pressed in between the branches B, the bar striking against the incline C will ride along said incline, and will thereby turn or swivel the catch to its engaging position, Figs. 1, 3, and 5, so as to automatically lock the bar.

The automatic locking of the bar is of great convenience, especially if an article to be secured to the person is in a place where the operation cannot be carefully watched—as, for example, the attaching of an ear-ring or the securing of a pin to a neckcloth.

As the two hook branches face in opposite directions, the bar A when locked is prevented by said branches from accidental disengagement by any lateral pressure or movement.

What I claim as new, and desire to secure by Letters Patent, is—

1. A catch for bars of ear-rings, lace-pins, and other articles, said catch consisting of two hooked branches joined by an incline, in combination with a swivel-support, substantially as described.

2. A catch for bars of ear-rings, lace-pins, and other articles, said catch consisting of two oppositely-facing hooked branches joined by an incline, in combination with a swivel-support, substantially as described.

In testimony whereof I have hereunto set my hand in the presence of two subscribing witnesses.

JULIUS BONNER.

Witnesses:
WM. C. HAUFF,
W. HAUFF.